Feb. 13, 1951   F. L. FULKE   2,541,157
CHAIN JOINT
Filed Feb. 15, 1947   2 Sheets-Sheet 1
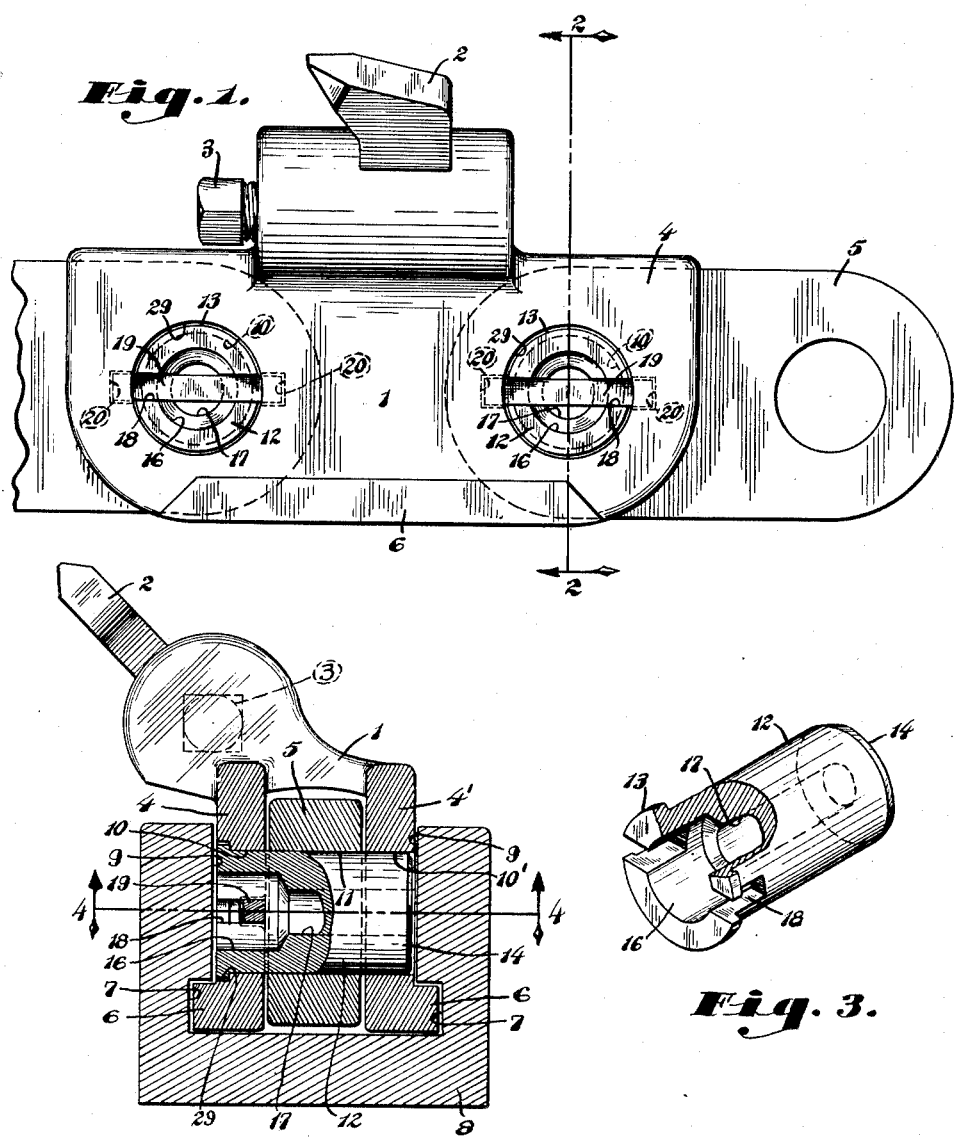
INVENTOR.
FRANK L. FULKE.

Feb. 13, 1951      F. L. FULKE      2,541,157
CHAIN JOINT

Filed Feb. 15, 1947      2 Sheets-Sheet 2

INVENTOR.
FRANK L. FULKE.
Frank L. Fulke

Patented Feb. 13, 1951

2,541,157

UNITED STATES PATENT OFFICE 2,541,157

CHAIN JOINT

Frank L. Fulke, Terre Haute, Ind.

Application February 15, 1947, Serial No. 728,811

8 Claims. (Cl. 74—254)

My invention relates to the journal jointing of adjacent links in cutter chains, conveying or excavating, or other types of heavy chains, and especially to those types which, in use, are so closely associated with guideways as to prohibit the projection of pintles or locking devices beyond the chain link surfaces.

A particular objective of my invention is to provide an improved chain joint and it has for a further prime objective the provision of convenient and reliable means for connecting or disconnecting the chain links. Other objectives may appear as the following description continues, it being understood that the particular structural details disclosed herein are illustrative of preferred embodiments of the invention, and that considerable latitude in departing from them may be allowable without departing from the objectives and scope of the invention.

In the drawings:

Fig. 1 is a fragmental plan view of a chain for cutting coal and embodying my invention;

Fig. 2 is a transverse section taken on the line 2—2 of Fig. 1 and showing the chain associated with its guideway;

Fig. 3 is a perspective view of a journal pin contemplated by my invention;

Figure 4:
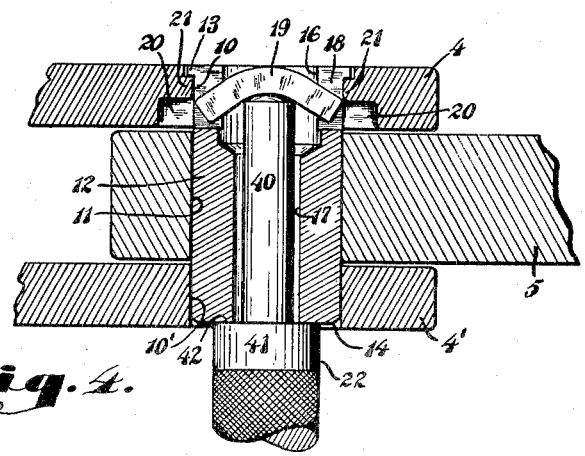
Fig. 4 is a section taken on the line 4—4 of Fig. 2.

In the present specification and claims, such terms as "upper" and "lower," and "upward" and "downward," are used for the sake of clarity and coherence in describing the upper and lower sides of the chain and the apparatus associated with each side. In most coal cutting machines, such as the short-wall types, the cutter chain does at all times operate with a certain one of its sides always downward. However it should be remembered that in some track mounted machines the cutter-bar may be operated to saw a vertical slot in the coal seam, so that neither side of the chain would be strictly the up side or the down side, and some newer machines can even turn their cutterbars completely over so as to present either side of the chain as its up side or its down side.

In Fig. 1, I have shown a chain block link 1 carrying a bit 2 clamped by set screw 3 for cutting coal. Link 1 has spaced parallel arms 4, 4', which embrace a link 5 used to connect adjacent bit links in the chain. Link 1 has guiding lips 6 at its edges which operate in grooves 7 in the chain guide 8, and very slight clearance exists between the sides of the chain and the side lips 9 of the guide, whereby the chain is closely supported in the guide. In such chains it is therefore not possible to project a journal pin outwardly past the sides of the chain in order to employ a cotter pin or other external means to hold such journal pin against undesired movement.

The arms 4, 4' of bit link 1 are provided with aligned apertures 10, 10'. The connecting link 5 has a bore 11 of suitable size to swivel on a hardened journal pin 12 having an enlarged head 13 at its upper end fitted into a countersink 29 in aperture 10 of the upper arm 4; and the lower end 14 of said pin fits in aperture 10' of lower arm 4' of the bit link. The head 13 will at all times prohibit axial movement of the journal pin downwardly beyond the illustrated position thereof, by engagement with the base of the countersink 29, aperture 10 being smaller than said head.

At its larger end, journal pin 12 is bored as at 16 and is milled entirely across to define an open slot 18, the bore 16 being of greater depth and greater width than slot 18. I may choose to extend bore 16 entirely through journal pin 12 as indicated at 17, such practice being adaptable to relieve bore 16 from clogging with foreign matter, and producing a further desirable function which will be explained hereinafter. In the slot 18 a bar 19 of material softer than that of journal pin 12 and arm 4 is carried. This bar 19 is considerably longer than the slot 18 and can only be introduced into slot 18 in the form of an upward arch, as indicated in Fig. 4.

In the inside surface of upper link arm 4 a pair of indentations 20 (Fig. 4) are formed contiguous to and opening into the aperture 10, upon a common line parallel with and central of the slot 18 when the journal pin 12 has been fully inserted into operative position.

After arched bar 19 has been placed in the slot 18 it may be pressed down to straighten out the arch. This will force its ends to protrude past the diameter of aperture 10 into the pair of indentations 20 in the inner side of link arm 4. The protruding ends of bar 19 will therefore be hooked securely under the lips 21 overlying indentations 20, so that journal pin 12 cannot possibly move axially upward except by shearing the bar 19.

It will also be apparent that the interlocking of the protruded ends of locking bar 19 into the indentations 20 of link arm 4 prohibits any rotary movement of journal pin 12 relative to link 1 except by shearing the bar 19 in two places; and it is substantially impossible that enough frictional force could be exerted by the swivelling of link 5 so to shear said bar.

The journal pin 12 is therefore securely locked against rotation in link 1 and against axial movement downward or upward therein. Since operating stresses which might come upon the journal pin 12 to move it axially upward or to rotate it are not forceful, being only frictional and vibrational, I prefer to form locking bar 19 of soft aluminum or of lead.

When it is desired to remove a journal pin 12 so as to disconnect a link, it is only necessary to insert a small screwdriver or other prying tool into bore 16 so as to hook it under bar 19 and pry it upward to again arch it, whereupon its protruding ends will be retracted from indentations 20 to release the journal pin for convenient removal upwardly through link aperture 10.

Alternatively, if the bore 17 is formed in the pin, a blunt tool such as that illustrated at 22 in Fig. 4 may be driven upwardly through said bore to deform and so remove the bar 19. The particular tool illustrated may be used effectively both to remove the bar 19 and to remove the pin 12. That is, as shown the tool comprises a shank 40 sized to pass through the bore 17, and an enlarged stem 41 sized to define a shoulder 42 engageable with the pin end 14. In use, a heavy blow upon the end of the stem 41 will arch the bar 19, and the length of the shank 40 is such that, as the ends of the bar 19 are withdrawn from the recesses 20 by the arching of said bar, the shoulder 42 will contact the pin end 14 to drive the pin 12 out of its seat in the apertures 10 and 10'.

The locking bar and journal pin are at all times inside the outer surfaces of link 1 while the chain is in operation. No effort and little time is required to couple or uncouple the chain, no special tools are required as with driving rivets, and the locking bar 19 may be re-used. This is of particular advantage since special rivets or bars or whatever is required are not always available at such times or places as the chain might require connecting or disconnecting.

Figure 5:
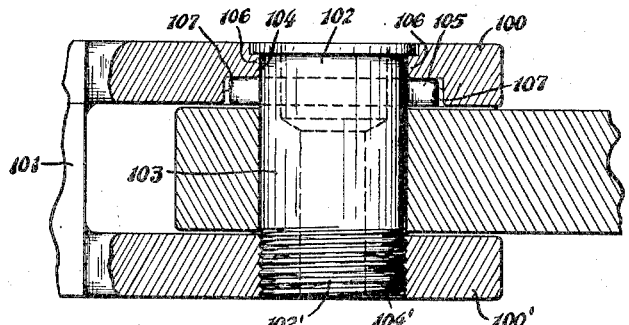
Fig. 5 is a similar view of a modified form of my invention.

If it be desired so to associate the ends of the journal pin with the arms of the link as to prohibit spreading apart of the arms, Fig. 5 shows how this may be readily accomplished.

The arms 100, 100' of the link 101 support the ends 102, 102' of journal pin 103 in aligned apertures 104, 104'. An end 102' of the pin is threaded and the aperture 104' is cooperatively threaded. End 102 of the pin is slotted across as previously described for cooperation with locking key 105, and shoulder 106 will prohibit upper arm 100 from spreading upward, and the threads at the pin end 102 will prohibit lower arm 100' from spreading downward, after journal pin 103 is screwed into operating position. This may readily be done by a flat edged tool applied in the slot, and thereafter the locking key 105 is inserted in arched form and then compressed into a straight bar whereby its ends protrude into recesses 107 of the link. Obviously the function of locking key 105 will then be to prohibit rotation of journal pin 103, since its axial movement is otherwise prohibited.

Figure 6:
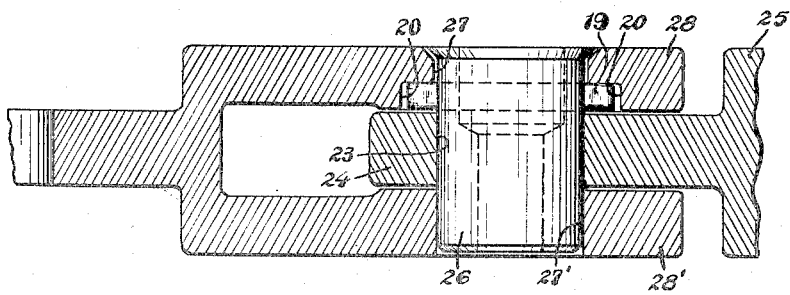
Fig. 6 is a similar view of a further modification.

My invention may be of particular desirability in excavating or trenching chains, or conveyor chains operating across abrasive slag piles or carrying highly abrasive materials. It may be desirable to make such chains from high manganese steel. This material is not machinable and can only be cast into shape, and I have so contrived my invention as to make this possible. In Fig. 6, parts of such a chain are shown. It may desirably be made up of identical links each having one male and one female end, so that bore 23 in the male end 24 of link 25 swivels on journal pin 26 which has its ends supported in aperture 27 in the upper arm 28 and in aperture 27' in the lower arm 28' of the adjacent link. The core used for spacing apart the arms 28, 28' may have lugs to core out the apertures 27, 27' and the indentations 20. The journal pin 26 may be readily cast in high manganese steel by employing a core to form the slot across its head and the bore of greater depth and width, as clearly shown in Fig. 6. For this service it may be preferable to employ a locking bar 19 of soft stainless steel, which, while readily bendable, is quite resistant to abrasion and impervious to corrosion.

In this way all the links and journal pins may be of high manganese steel, without any machining of any part being necessary, and it may be noted that the stainless steel locking bar is completely sheltered within the link surfaces, being completely internal of the link.

I claim as my invention:

1. In a chain comprising links flexibly connected for traveling about a closed orbit, means entirely internal of the chain for detachably associating each of said links to an adjacent link, said means including a journal pin fixedly carried by one link for a connected link to swivel upon, said pin being provided with a transaxial slot opening through one end thereof and through the perimetral surfaces of said pin at substantially diametrically spaced points, and a malleable bar carried in said slot to lock said pin against axial movement in one direction relative to the said link in which it is fixedly carried, said bar having an axial length exceeding the diametrical dimension of said pin and being insertable in said journal pin only in arched form, said bar further being movable relative to said journal pin under pressure applied axially of said journal pin to deform said arch and to simultaneously force the said bendable element to extend itself outward of the walls of said journal pin in a plane at right angles to the axis of said journal pin, said link being provided, at points registering with the opposite ends of said slot, when said pin is in operative association with said link, with two recesses, each opening radially inwardly into communication with said slot and axially inwardly away from said one end of said pin.

2. In a chain comprising links flexibly connected for traveling about a closed orbit, a link having parallel spaced arms connected to a second link swivelling between said spaced arms, said arms and said link being perforated by aligned apertures for supporting in each arm one end of a journal pin passing through said second link, and means entirely internal of the chain for locking said journal pin against axial movement in said arms, said means including a transaxial slot traversing said pin in the region received in the aperture of one of said arms and opening through the adjacent end of said pin, at least one indentation in the inner wall of said one arm contiguous to and opening radially into its said aperture to register with said slot and further opening axially toward the other of said arms, and further means carried in said journal pin slot and movable longitudinally of said slot to protrude itself into said indentation.

3. In a chain comprising links flexibly connected for traveling about a closed orbit, means including a journal pin for detachably connecting a link having a pair of spaced parallel arms with a link swivelling between said arms, said journal pin having its ends supported in aligned apertures in the two said arms, that wall of one arm which faces a side of said swivelling link being provided in its surface facing the other arm with an open indentation diametrically traversing, and opening from opposite points into, the aperture of said one arm, and said means further including an element in said journal pin and in said aperture expandable oppositely beyond the confines of said aperture into said indentation, the expanded length of said element being greater than the diameter of said aperture but less than the overall length of said indentation.

4. In an endless chain, a link bifurcated to define spaced parallel arms adapted to embrace therebetween another link, said arms having aligned apertures, a hardened journal pin having its opposite ends respectively received in said apertures, the upper end of said pin being larger than the aperture of the upper of said arms whereby a shoulder is defined on said pin engaging downwardly against a link surface to limit axial movement of said pin downwardly, an open slot across the upper end of said pin, a pair of indentations beneath the upper surface of said upper arm opening into and bisecting the aperture of said upper arm and further opening into the lower surface of said upper arm, and detachable means received in said slot and said indentations for securely locking said journal pin into operative position and against upward axial movement.

5. In combination, in a chain comprising links flexibly connected for travelling about a closed orbit, an outer link bifurcated to define spaced parallel arms, said arms being provided with aligned apertures, a hardened journal pin supported between said arms with its ends received in said apertures, an inner link embraced between said arms and having an aperture through which said journal pin passes whereby said inner link may swivel between said arms, said journal pin having a shoulder defined by an increase in its diameter, said shoulder engaging a link surface to prohibit downward axial displacement of said pin, that end of said pin received in the aperture of the upper of said arms being traversed by a transaxial slot opening through said pin end, and means to prohibit upward axial displacement of said pin including a detachable deformable element lying in said slot and projecting therebeyond into a recess formed in said upper arm and opening into said last-mentioned aperture, said recess lying beneath the upper surface of the said upper arm and opening through the lower surface thereof.

6. In a chain comprising links flexibly connected for traveling about a closed orbit, an outer link bifurcated to define parallel spaced arms having aligned apertures, a journal pin having its opposite end portions respectively supported in said apertures, an inner link swivelly mounted on said pin between said spaced arms, said journal pin having an enlargement of its diameter whereby is defined a shoulder engaging against a link surface to prohibit axial movement of the journal pin in one direction, and means entirely internal of the chain for prohibiting axial movement of the journal pin in the opposite direction, said means including a recess contiguous to and opening into said aperture of the said outer link and disposed inside the outer surface of said outer link whereby it is not visible from the outside of said link and opening through a link surface facing toward said inner link, and said means further including an interlocking expandable element movable in said recess and in said journal pin to securely interlock said journal pin with said outer link.

7. In a chain having links flexibly connected for traveling about a closed orbit, some links having spaced parallel arms with aligned apertures for supporting therein the ends of a journal pin, and internal links sized and apertured to swivel on said pin between said arms, means to prohibit rotation of said pin in said arms including a locking key lying in a slot traversing an end of said pin and protruding laterally beyond the confines of the arm aperture associated with said slotted end of said pin into arm recesses radially disposed about said aperture, said arm recesses being disposed in that side of said arm which faces toward an internal link, together with means to prohibit spreading apart of said arms including a shoulder on one end of said pin and threads on its opposite end and in the arm aperture associated with said opposite end.

8. In a chain comprising a bifurcated link and a second link having a portion received between the furcations of said first-named link, said furcations and said portion being provided with aligned apertures, means providing a pivotal connection between said links comprising a journal pin entered in said aligned apertures, that surface of one of said furcations remote from its fellow being provided with a socket communicating with its aperture but projecting beyond the perimeter thereof, and a projection on the end of said pin entered in said aperture seating in said socket to limit axial movement of said pin toward said fellow furcation, said end of said pin lying substantially flush with said furcation surface, that surface of said one furcation nearer its fellow being provided with a socket communicating with its aperture, projecting beyond the perimeter thereof and opening through said last named surface, said pin end being formed with a transverse groove opening through a perimetral surface thereof and registering, when said pin is in operative position, with said last-named socket, and a bendable bar receivable in said groove and in said last-named socket, said bar, when straight, having a length greater than the length of said groove and projecting from said groove into said socket to lock said pin in place, but being bendable about an axis transverse to its length to reduce its effective length and permit its entry or removal from locking position.

FRANK L. FULKE.

REFERENCES CITED

The following references are of record in the file of this patent:

UNITED STATES PATENTS

| Number | Name | Date |
| --- | --- | --- |
| 1,737,823 | Bodle | Dec. 3, 1929 |
| 2,332,408 | Stenger | Oct. 19, 1943 |
| 2,365,228 | Vanderzee | Dec. 19, 1944 |